W. P. BONDS, Jr.
TILLAGE IMPLEMENT.
APPLICATION FILED FEB. 7, 1917.
1,249,008.
Patented Dec. 4, 1917.
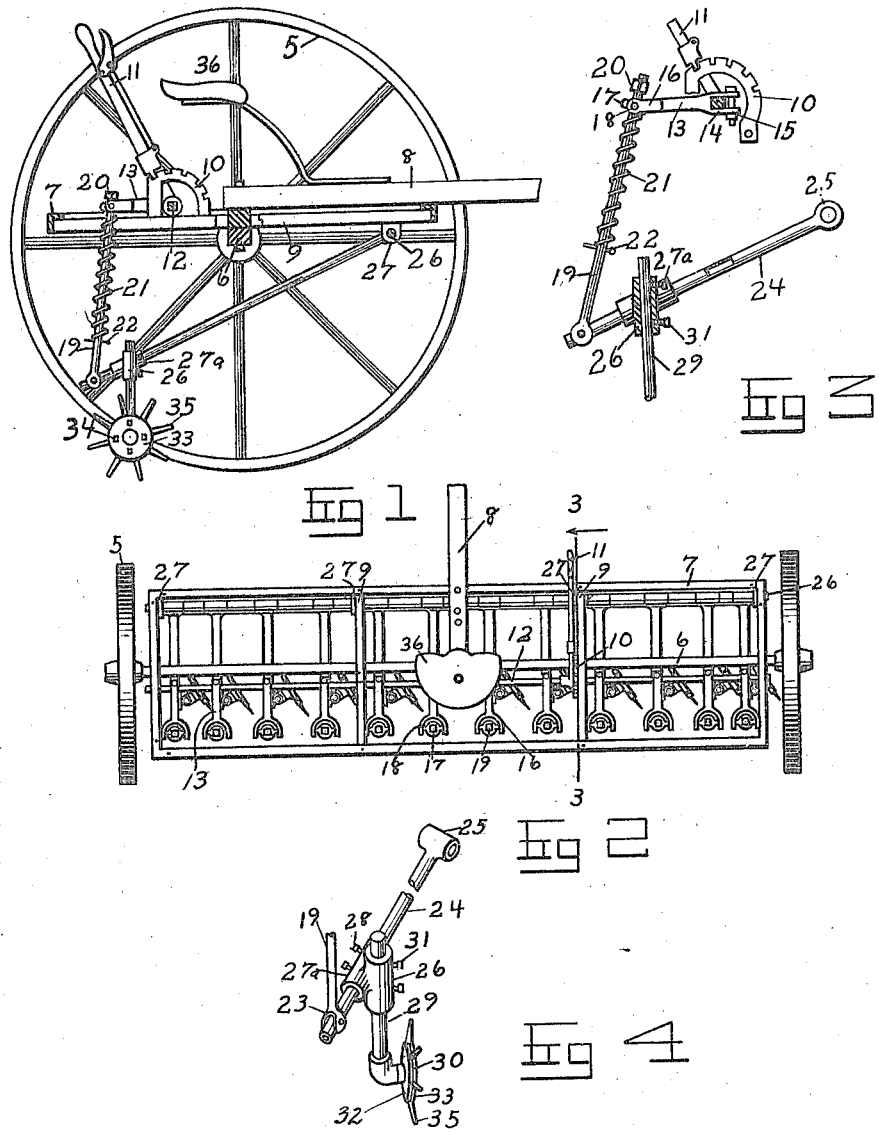
Inventor
Walter P. Bonds, Jr.
Witness Berkley E. Wiglesworth
By Shepherd & Campbell
His Attorneys

UNITED STATES PATENT OFFICE.

WALTER P. BONDS, JR., OF ROSWELL, TEXAS.

TILLAGE IMPLEMENT.

1,249,008.　　　　Specification of Letters Patent.　　Patented Dec. 4, 1917.

Application filed February 7, 1917. Serial No. 147,232.

*To all whom it may concern:*

Be it known that I, WALTER P. BONDS, Jr., a citizen of the United States of America, residing at Roswell, in the county of Bosque and State of Texas, have invented certain new and useful Improvements in Tillage Implements, of which the following is a specification.

This invention relates to tillage implements of the harrow type and its object is to provide an improved device of this nature constructed in such manner that it may be used to break the crust of the surface of the ground, harrow the soil, and leave a dust mulch in such proximity to growing plants as to effectually cultivate the plants without injury to the same.

It is a further object of the invention to provide an implement of the character above set forth which by reason of its novel construction may be used in relation where ordinary harrows cannot be used without injury to the plants.

Further objects and advantages of the invention will be set forth in the detailed description which now follows:

In the accompanying drawing,

Figure 1 is a longitudinal, vertical section of a tillage implement constructed in accordance with the invention.

Fig. 2 is a plan view thereof.

Fig. 3 is a detail sectional view upon line 3—3 of Fig. 2, and

Fig. 4 is a detail perspective view illustrating the mounting of the toothed disk hereinafter described.

Like numerals designate corresponding parts in all of the figures of the drawing.

Referring to the drawing, it will be seen that my improved tillage implement comprises a pair of ground wheels 5, a supporting axle 6, a rectangular frame 7 carried by the axle 6, a pole or tongue 8 and braces 9 extending between the front and rear members of the frame 5. One of these braces 9 carries a segmental rack 10 over which an operating lever 11 moves in the usual and well-known way. This operating lever is connected to an angular rock shaft 12, said rock shaft being journaled on the end members of the frame 5. The rock shaft carries a series of rocker arms 13, said arms being provided with forked ends 14 which embrace the rock shaft 12 and which forked ends are clamped to the rock shaft by bolts or equivalent fastening devices 15. The rear ends of the rocker arms are forked as indicated at 16 and receive collars 17 having transverse extensions 18 which are pivoted in the arms of the forks 16 so that said collars are adapted to rock within the forks. Rods 19 pass through these collars and have nuts 20 threaded upon their upper ends above the collars. Springs 21 bear between the collars and pins 22 which pass through the rods 19. The lower ends of the rods 18 are forked as indicated at 23 and are engaged with the rear ends of pull bars 24. The front ends of these pull bars are provided with eyes 25 which are journaled upon a transverse rod 26 supported from the front edge of the frame 5 by hangers 27. Each of the pull rods 24 carries a bearing bracket comprising a vertical sleeve 26 and an inclined sleeve 27ª, the latter being fixed upon its respective pull rod by set screws 28 and the former serving to receive the shank 29 of one of a series of toothed disks 30. The shank 29 is held in any adjusted position with respect to the sleeve 26 by set screws 31 and it will be noted that by virtue of this construction the angularity of these disks with respect to the line of travel may be changed by loosening the set screws 31 and turning the shank 29 to various positions of adjustment. In addition the position of the disks may be varied to vary the angle (with respect to the vertical) at which the teeth of the disks enter the ground. This is accomplished by loosening the set screws 28 and moving the collar 27 around the pull rod 24. By virtue of the last named adjustment the teeth of the several disks may be caused to produce a more or less shallow under-cut beneath the surface of a crust formed upon the ground which, in conjunction with the angle at which the disk is set with respect to the line of travel, results in thoroughly breaking up the soil without injuring the adjacent plants. Preferably the toothed disks are composed of plates 32 and 33 secured together by nuts and bolts 34 and binding between them the teeth 35 of the disks. These teeth may be of any desired shape. They may taper from their inner portions toward their points or they may be of the same size throughout their entire length and they may be of any desired shape in cross section.

As will readily be understood, when a driver seated in the drivers seat 36 throws the operating lever 11 forward all of the disks will be lifted from the ground by the action of the rock shaft and the rocker arms 13. When the operating lever is thrown to the position illustrated in Fig. 1 the disks are brought into engagement with the ground and each disk is independently spring actuated to cause it to seek out the hollows in the surface of the ground and to enter any water furrows which may have formed to thereby efficiently cultivate the entire surface of the soil and improve the stand of the seed contained within the seed bed.

This implement is highly efficient not only for harrowing ground preparatory to planting the seed and for breaking up the crust of the ground after rains and before the plants have appeared at the surface but it is also useful to cultivate around growing plants. It is also especially adapted for harrowing or cultivating young cotton or corn, breaking the crust and thus destroying small vegetation which pulls away with the crust and leaves the ground in fine shape. It is also useful in harrowing small grain that is sown broad-cast. It will break the crust, cultivate the ground and leave a dust mulch which will retain the moisture. It is a particularly advantageous feature of the present invention that it cultivates in the furrow as well as upon the tops of rows. Some types of harrows heretofore used drag down the beds and cover the furrows thus dragging up the plant if it is on a hill or covering it up if it is in the furrow. In addition, the present structure does not catch trash to the extent that the old style harrows catch the trash. Other harrows heretofore used catch the trash and drag it over the plants, bruising them and injuring the growth and reducing the stands.

Solid disk harrows are only useful in preparing the ground for planting. If a solid disk harrow is run over growing crops it will cut up the plant while if it is run over land that has just been planted it will move the seed out of line in the drill and heave most of them out on top of the ground. Disks of the type employed by me will not cut the plants nor disturb the seed in the drill but will destroy young vegetation that will pull up with the breaking of the crust such as grass and the like. Furthermore, the adjustment secured through the medium of set screws 28 and the sleeve 27 produces an adjustable under-cut that is particularly efficient in breaking up the soil.

From the foregoing description it will be seen that simple and efficient means are herein provided for accomplishing the objects of the invention but while the elements shown are well adapted to serve the purpose for which they are intended it is to be understood that the invention is not limited to the precise construction set forth but includes within its purview such changes as come within the spirit of the appended claim.

Having described my invention what I claim is:—

The combination with a pull rod, of a toothed disk having a vertically disposed shank, a sleeve through which said vertically disposed shank passes, a sleeve disposed at an angle with respect to the first named sleeve and integral therewith, engaging said pull rod means for binding the last named sleeve in varying positions of adjustment around the pull rod and means carried by the first named sleeve for binding the shank in varying positions of rotative adjustment therein.

In testimony whereof I affix my signature in presence of two witnesses.

WALTER P. BONDS, Jr.

Witnesses:
A. B. HIX,
W. A. VAUGHN.

Copies of this patent may be obtained for five cents each, by addressing the "Commissioner of Patents, Washington, D. C."